US007961857B2

(12) United States Patent
Zoldi et al.

(10) Patent No.: US 7,961,857 B2
(45) Date of Patent: Jun. 14, 2011

(54) NETWORK ASSURANCE ANALYTIC SYSTEM

(75) Inventors: Scott M. Zoldi, San Diego, CA (US); Michael P. Balon, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 1378 days.

(21) Appl. No.: 11/446,453

(22) Filed: Jun. 1, 2006

(65) Prior Publication Data

US 2007/0036309 A1 Feb. 15, 2007

Related U.S. Application Data

(60) Provisional application No. 60/686,796, filed on Jun. 1, 2005.

(51) Int. Cl.
*H04M 15/00* (2006.01)
(52) U.S. Cl. .............. 379/114.14; 379/115.03; 379/120; 379/134
(58) Field of Classification Search .................. 379/111, 379/112.01, 112.05, 112.06, 112.07, 114.01, 379/121.01, 133, 134, 136, 115.03, 120
See application file for complete search history.

(56) References Cited

U.S. PATENT DOCUMENTS

| | | | | |
|---|---|---|---|---|
| 5,309,448 A | * | 5/1994 | Bouloutas et al. .............. 714/25 |
| 5,699,403 A | * | 12/1997 | Ronnen ...................... 379/15.04 |
| 5,757,895 A | * | 5/1998 | Aridas et al. .................. 379/136 |
| 5,917,898 A | * | 6/1999 | Bassa et al. .................. 379/133 |
| 6,298,123 B1 | * | 10/2001 | Nolting et al. ................ 379/111 |
| 6,437,812 B1 | | 8/2002 | Giles et al. |
| 7,570,750 B2 | * | 8/2009 | Armanino et al. ............ 379/126 |
| 2004/0153382 A1 | * | 8/2004 | Boccuzzi et al. ............... 705/34 |

FOREIGN PATENT DOCUMENTS

| | | |
|---|---|---|
| WO | WO 98/32259 | 7/1998 |
| WO | WO 99/13427 | 3/1999 |
| WO | WO 99/31925 | 6/1999 |

\* cited by examiner

*Primary Examiner* — Binh K Tieu
(74) *Attorney, Agent, or Firm* — Mintz, Levin, Cohn, Ferris, Glovsky and Popeo, P.C.

(57) ABSTRACT

A network assurance analytics (NAA) system and method is disclosed. The NAA can be part of a risk analytic for telecom (RAFT) program. The NAA system is configured to monitor telecommunications networks, detect errors or fraud in those telecommunications networks, and provide solutions to resolve the errors or reduce the fraud. Traffic of a telecommunications network is electronically monitored for at least one pattern that is indicative of a telecommunications anomaly. Based on a set of a set of telecommunications profiles stored in a database, a model score representing a value of the telecommunications anomaly is generated. A solution for the telecommunications network to reduce the model score associated with the telecommunications anomaly is then generated for execution on the telecommunications network.

10 Claims, 19 Drawing Sheets

Free Slot Index

| 0 |
|---|

Shared Memory (Hash Table)

| index | Data Block | link |
|-------|------------|------|
| 0 | | 1 |
| 1 | | 2 |
| 2 | | 3 |
| 3 | | 4 |
| 4 | | 5 |
| 5 | | 6 |
| 6 | | 7 |
| 7 | | 8 |
| 8 | | 9 |
| ... | | ... |
| n | | n-1 |

Hash Index

| Index | Memory Bock Index |
|-------|-------------------|
| 0 | null |
| 1 | null |
| 2 | null |
| 3 | null |
| 4 | null |
| 5 | null |
| 6 | null |
| 7 | null |
| 8 | null |
| ... | ... |
| n | null |

FIG. 2B

NETWORK ASSURANCE ANALYTIC SYSTEM

CROSS REFERENCE TO RELATED APPLICATIONS

The present application claims priority under 35 U.S.C. §119 to U.S. Provisional Application Ser. No. 60/686,796, filed Jun. 1, 2005, entitled NETWORK ASSURANCE ANALYTIC SYSTEM, the disclosure of which is incorporated herein by reference.

BACKGROUND

Revenue leakage is a telecommunications term that pertains to a condition that occurs when a carrier or provider cannot bill for call. Leakage can occur due to misconfigured B-party numbers, faulty switches and routes, or fraudulent or misconfigured interconnect operator switches. Another source of revenue leakage issues is manipulation of Answer No Charge indicators in the SS7 data stream which result in no billable call detail record from being generated.

Other sources of network issues are "pinging" and "Calling Line Identity (CLI) dumping." Both cause tremendous congestion issues on the network which result in quality of service issues and loss of revenue from legitimate usage. In pinging, an autodialer will make tens of thousands to hundreds of thousands of calls to random B-party numbers and release the line before the call can be answered in the terminating end. CLI dumping is similar, but it occurs in the mobile environment where the CLI is delivered to the terminating phone in hopes that it will elicit a call-back. Related to pinging and CLI dumping is "mechanical dialing."

Congestion is a major issue for telecommunication networks, either due to deliberate attack or major world events that cause unexpected volumes on the network which cause re-routing of calls and eventual failure. In addition to detecting congestion, to prevent leakage a carrier would have to identify the source of the congestion.

A condition known as "tromboning" is a major source of both revenue leakage and also of network congestion and reduced availability. This activity involves multiple hops across the interconnect either due to fraudulent manipulation of the routing tables for through network manipulation. These extra hops take up bandwidth for legitimate calls and produce revenue for interconnect operators that take advantage of arbitrage of interconnect fees. If a call hops across the interconnect 1000 times, that means that one billable call takes up the bandwidth for 999 other calls in addition to the original call. This results in a loss of bandwidth for the operators and consequently quality of service and revenue issues.

Another source of congestion and failure particularly in an intelligent network (IN), are voting scenarios. Since the IN is critical to the health of a network, voting events will have their voting numbers directly input in the routing tables of the network. Fraudsters have determined that, given the large volume of these votings, some percentage of calls will be misdialed and they therefore purchase these nearby numbers for premium rate services. When misdials occur the fraudster may play back a busy signal prompting the caller to re-dial the misdialed number repeatedly causing huge volumes on the IN network leading to failure of the IN and of critical functions in the network such as 911 service and toll-free services.

SUMMARY

This document discloses a network assurance analytics (NAA) system as part of a risk analytic for telecom (RAFT) program. This NAA system is configured to monitor telecommunications networks, detect errors or fraud in those telecommunications networks, and provide solutions to resolve the errors or reduce the fraud.

In one aspect, a computer-implemented method of network assurance analytics includes electronically monitoring traffic of a telecommunications network for at least one pattern that is indicative of a telecommunications anomaly. Then, based on a set of a set of telecommunications profiles stored in a database, the method includes generating a model score representing a value of the telecommunications anomaly. The method further includes generating a solution for the telecommunications network to reduce the model score associated with the telecommunications anomaly.

In another aspect, a computer-implemented method includes the steps of detecting from telecommunications traffic at least one pattern that is indicative of a telecommunications anomaly, generating a model score representing a value of the telecommunications anomaly, and generating one or more reason codes based on the telecommunications profiles, each reason code representing a relationship between the value of the telecommunications anomaly and the at least one pattern.

In yet another aspect, a network assurance analytic system includes a monitor that captures call records from traffic of a telecommunications network, a profile retriever that parses a call record to determine a calling line identity (CLI), a point code (PC) and a route (RT) associated with the call record, and a database that stores a CLI profile, a PC profile, and an RT profile of the traffic. The system further includes a processor that compares the CLI, PC and RT with the respective CLI profile, PC profile and RT profile to determine whether a telecommunications anomaly exists in the traffic.

In yet another aspect, a method of detecting revenue leakage in a telecommunications system includes the steps of detecting characteristics of non-reconciled SS7/C7 service detail records for calling line identities across point codes and routes of the telecommunications system, and reporting the detected characteristics in a hierarchal summarization.

In yet another aspect, a method of detecting revenue leakage in a telecommunications system includes the steps of detecting characteristics of non-reconciled SS7/C7 service detail records for calling line identities across point codes and routes of the telecommunications system, and generating an absolute value, frequency and proportion for at least one of the detected characteristics. In another aspect, the method includes generating a hierarchical summary report of the absolute value, frequency and proportion for the at least one detected characteristic.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIGS. 2A and 2B illustrate an in-memory profile, chained hash implementation.

DETAILED DESCRIPTION

Figure 1:
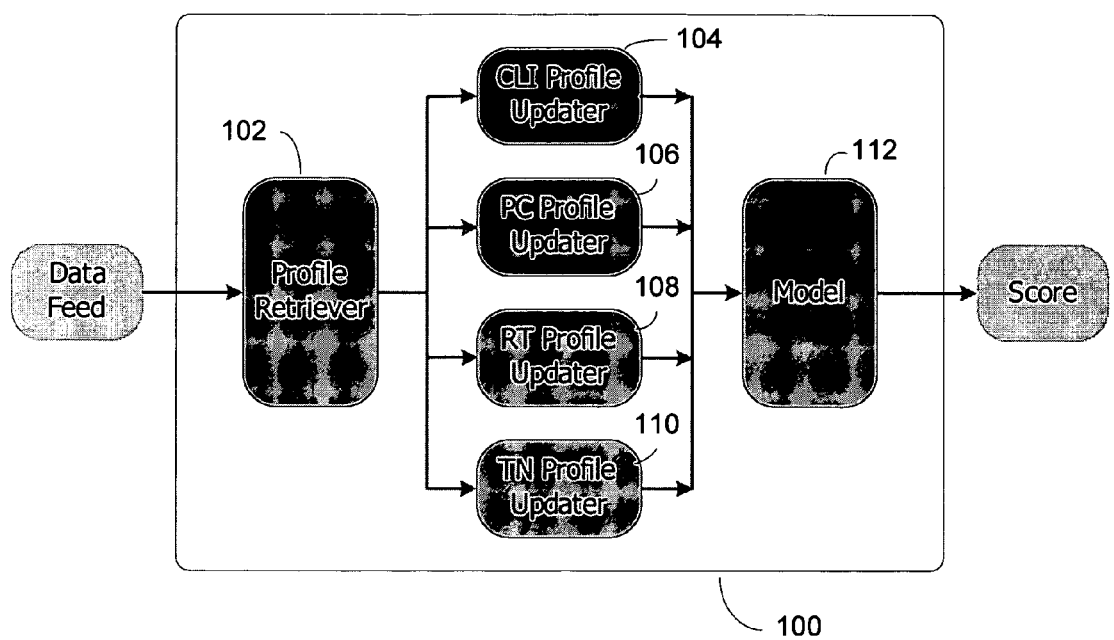
FIG. 1 illustrates a network assurance analytics system architecture.

This document describes a network assurance analytics (NAA) system as part of a risk analytic for telecom (RAFT) program. This NAA system is configured to monitor telecommunications networks, detect errors or fraud in those telecommunications networks, and provide solutions to resolve the errors or reduce the fraud.

The NAA system uses hundreds of recursive variables to detect patterns in the telecom activity that can be indicative of network issues or risk. This risk is reflected in a model score that rank orders the risk and severity of the network assurance and revenue assurance issue in the network. In addition to the model score, reason codes are provided that indicate relationships in the data (and captured by the recursive variables) that caused the model score. This information is then used in conjunction with the case information to point to the source of the network assurance issues to allow the network operators the ability to isolate and address the network issues.

In some embodiments, a NAA system uses a number of profiles for performing network assurance. Profiles are concise yet sophisticated mathematical characterizations of calls occurring in a telephony network, and the profile technique has proven power in predictive analytics. The profiles contain exponentially-decayed recursive variables capable of summarizing the history of calling behavior occurring. In a specific exemplary embodiment, a NAA system uses five profiles at four levels. These four levels are:

1. Calling Line Identity (CLI): The originating phone number.
2. Point Code (PC): A node in the C7/SS7 signaling network.
3. Route (RT): The direct path from PC A to PC B, which is different than from B to A.
4. Terminating number (TN): The terminating number of the phone call.

At the CLI level, two different profiles are used: one for home customers and the other for non-home customers. Therefore, five distinct levels of profiles are provided in total. For each level, the shared memory system will have the same number of profiles as the number of keys seen by the NAA system. For example if the network has 25,000 unique routes, 5,000 unique point codes, 50 million unique home CLIs, 40 million unique non-home CLIs, and 100,000 B-party numbers, then the shared memory architecture will support this number of profiles in each of the categories above. For non-home CLI, the shared memory system has been configured to age the oldest profiles to allow the stale profiles to be removed, allowing for the optimal placement of the most current profiles in the shared memory.

The CLI profiles (for home and non-home customers) summarize patterns of activities specific to a CLI. The PC profile contains the patterns of aggregated traffic traversing through a PC. By the nature of network analytics, traffic behavior at the PC level is a larger concern than that at the CLI level (and at other levels). Hence, the PC profile plays a larger role than the other profiles in determining the risk of network-threatening events. The RT profile summarizes traffic patterns traveling through a direct route between two PCs. The RT and PC profile contains variables that can indicate where network assurance issues are originating such as at an interconnect switch or for traffic from a particular interconnect operator. The TN profile is used to incorporate patterns of calls to a terminating phone number, and the profile is designed to detect massive misdials to "voting" numbers using fuzzy matching of a set of "risky" or "expensive" numbers specified by the operator.

FIG. 1 illustrates the architecture of a NAA system 100. When a call record comes in to the system, a profile retriever 102 parses the record to obtain its CLI. Depending on whether or not the CLI belongs to the home operator, a home-CLI profile or a non-home-CLI profile is retrieved. The profile retriever 102 also extracts the identifications of the PC and the RT associated with this record, and retrieves the corresponding PC and RT profiles, respectively. The profile retriever 102 further inspects the terminating phone number in this record. If the terminating number matches a fuzzy match on the "risky" or "expensive" number list, the TN profile corresponding to this terminating number is retrieved.

Every profile is unique, as they contain variables that characterize the unique set of Signaling System 7 (SS7) Service Detail Record (SDR), SS7 TDR, SDR Retail, SDR Interconnect, and SDR IN records associated with the keys of CLI, PC, RT, and Terminating Number (TN). After the profiles are retrieved, a set of profile updaters (CLI profile updater 104, PC profile updater 106, RT profile updater 108, TN profile updater 110) compute new values of the variables in the profiles, utilizing new information contained in the just-arrived call record.

The selection of the variables to be included in the profiles and the construction of the exponentially decayed recursive formulas used to update the profiles are both data-driven and based on expert domain knowledge. The profiles are then saved. The updated profiles are the direct inputs to the model, and the model combines the inputs and generates a score reflecting the risk of network-threatening events. In addition, the model produces reason codes with the score, indicating network events that are most posing this risk.

Analytic exponential-decayed recursive variable profiles and the models are at the core of the NAA system. Profiles pre-process call records to capture essential patterns of calls traversing a network, in a powerful and concise way. The profiles themselves are direct inputs to the model employed in the NAA system 100, which in turn produces a risk score as well as reason codes.

The NAA system 100 is configured to detect network issues that can bring rise to revenue leakage and network congestion/delivery issues. As such, the NAA system 100 makes use of the shared memory architecture to accommodate a large number of calls per day. For example, the NAA system must process up to and in excess of 1.5 billion calls per day. The data to be processed included SS7 SDR, SS7 TDR, SDR Retail, SDR Interconnect, and TDR Intelligent Network records. The real-time component provides that the API be designed such that there would be no contention between the profiles with smaller number of keys, which in our application was route and point code keys. Therefore, the definition of the routes are modeled to be a combination of both originating and destination point codes which ensured that when a 24-way hash is applied to originating point code that there is no contention for point code or route profiles between the 24 independent processes. The CLI profiles and terminating number profiles could have some contention, but the NAA system can uniquely hash on CLI number between the 24 processes to minimize contention in the system which increase computational speed of the system.

One of the major functions of the NAA system 100 is the ability to do full reconciliation of the Retail SDRs with SS7/C7 SDRs through storing essential SS7/C7 SDR information from the probe records to use in the reconciliation with the billable events. Each CLI profile records SS7/C7 records in a temporary rotating array and contains sufficient detail to reconcile a billable record. One billable call can be broken up across "cut" boundaries and therefore reconciliation is not exact but rather could be incremental since one billable SDR event could be made up of two or more records and be delayed several hours to see all partial records of the SDR record. Upon detecting discrepancies, the volume and severity of the discrepancies are accumulated at the CLI, PC, and RT levels to be used in the model to alert to the revenue leakage at these levels and also to indicate what is responsible for the leakage. This is detected through determining a mismatch or missing Retail SDR and then measuring the changes in the volumetrics of reconciliation violations over CLI, PC, and RT keys.

Reconciliation of SS7/C7 records at the CLI level allows for deep inspection of SS7/C7 SDR that do not reconcile, but does not afford enough information to understand the severity and extent of the non-reconciliation events. The NAA system therefore uses hierarchal summarization of characteristics of non-reconciled SS7/C7 SDR for CLI across point codes and routes where a detailed record-by-record reconciliation is not practical. Some of the characteristics used to isolate the causes of non-generation of Retail SDR include route identifier, serving/destination point codes, international/domestic, destination country, premium rate, mobile number, and dial around access codes. Utilizing the PC and RT profiles, non-reconciled SS7/C7 SDR characteristics computed at the CLI profile level are accumulated on a frequency and volume basis at the point code and route level. Absolute values and changes in the frequency and the proportion of reported characteristics indicate new and recurring sources of revenue leakage. Through these diagnostics, the NAA system allows users to quantify the extent and severity of specific sources of non-reconciliation throughout switch-to-bill process from identification of Chargeable Answer SS7/C7 SDR, guiding of switch records, rating of Retail SDR, and finally to generation of Retail SDR.

To monitor manipulation of Answer No Charge indicators in the SS7 data stream which result in a no billable call detail record from being generated, the NAA system uses ANC indicators which are common for certain types of calls. The NAA system encapsulates normal ANC usage and looks for calls associated with premium rate, international calling, and mobile calls that is marked ANC and also for changes in the volume of ANC over normal ANC behavior that may indicate changes in the network which would result in loss of revenue to the network operator.

For both pinging and CLI dumping, the NAA 100 measures the duration of completed Retail, Interconnect, and IN calls and incomplete SS7/C7 calls that terminate after the ACM which would indicate that the call reached its terminating number. The monitoring of this class of calls at the CLI, PC, and RT levels allows for detection of pinging and CLI dumping through changes in the volumetric levels of ACM-calls over various time-scales of interest.

The NAA system 100 detects mechanical dialing where there are patterns in the terminating numbers dialed by a number of inter-related CLI numbers. The NAA system 100 looks for sequential and offset dialing attacks through computing the distance between B-party numbers to understand whether there is a pattern that the computer is using to cover a number range specified by the hacker. This is accomplished by storing a finite number the B-party numbers at the CLI level to compute measures of the distance between B-party numbers. Volumetrics of sequential and offset dialing is detected at the CLI, PC, and ROUTE levels and ratio variables over differing time-scales detect significant velocity changes indicative of a start of mechanical dialing network attack in addition to absolute levels of mechanical dialing attacks. Special consideration is paid to PBX indicators in the Retail SDRs associated with the CLI so that the NAA system 100 links the PBX indicator to the SS7/C7 records which is not available in the raw SS7/C7. This linkage of the data records is provided by the profiles at the CLI level.

For congestion, the NAA system 100 is configured to monitor all network failure codes and CDR condition indicators that indicate that a particular switch or route is failing. This is accomplished through monitoring typical volumetrics of release-reasons in the SS7/C7 messaging associated with the calls. As the volumes of abnormal/failure release reasons increase over different time-scales, the NAA system 100 produces a score that is commensurate with the severity of the change in the failures, in addition to generating the absolute level of failure messages associated with the switch or route. The NAA system 100 also indicates the reasons of failure which can indicate whether the traffic is purposely manipulated or malformed, or whether the problem is due to normal congestion. In addition to detecting congestion, the source of the congestion including failing switches or particular interconnect traffic is identified.

For tromboning, the NAA system 100 works to consolidate all legs of the SS7/C7 calls and interconnect calls to differentiate legs of calls associated with a single call from duplicate records through oscillation in the originating PC/destination PC values in the SS7/C7 records. The NAA system 100 then monitors changes in the average number of hops associated with a particular CLI, PC, or RT to determine whether the network is experiencing tromboning.

For misdialing, the intelligent network (IN) is monitored in the NAA system 100 through monitoring of failure codes associated with the IN and changes in volumes of these failures beyond typical network efficiency and answer seizure ratios. Since the IN is critical to the health of a network, voting events will have their voting numbers directly input in the routing tables of the network. To detect misdialing behaviors, the NAA system 100 fuzzy-matches all B-party numbers with numbers associated with high volume voting events. When the NAA system 100 determines that the B-party is close within the misdial criteria, it will monitor the volume, duration, and timing of calls to the B-party number to understand deviations in the activity to the B-party number associated to the numbers proximity to a voting event.

The NAA system 100 uses a number, which can be hundreds or more, of recursive variables to detect patterns in the telecom activity at the CLI, RT, and PC level that can be indicative of network issues or anomalies. This risk is reflected in a model score that rank orders the risk and severity of the network assurance and revenue assurance issue in the network. In addition to the model score, reason codes are provided that indicate relationships in the data (and captured by the recursive variables) that caused the large model score. This information is then used in conjunction with the case information to point to the source of the network assurance issues to allow the network operators the ability to isolate and address the network issues.

The NAA system 100 can employ an In Memory Profile (IMP) system, preferably for use with a server and/or telecommunications system. In some implementations, a hash table is used. The IMP system enables the NAA system 100 to provide fraud protection for the telecommunications industry. The IMP system can include a combination of communication components, as well as a relational database. The IMP system processes telecommunications transactions in real-time, scoring them, and running business logic to determine whether cases should be generated for an analyst to review.

In some embodiments, the NAA system 100 utilizes ISAM database files to store profiles used as an input to a neural network for detection of anomalies such as suspicious activity. For each transaction, the profiles are read from the storage, passed to the model, updated with the latest account information then written back to disk. In some instances an ISAM Server is used to handle input/output commands and utilize caching algorithms to improve performance.

In an exemplary embodiment, the IMP system uses a Chained Hash table implementation. The primary operations (Find, Insert, Update, Delete) for a hash table implementation take at least O(1) time operation since a direct index is being used to access the slot in memory provided that there is only one element in the chain. For multiple elements in the chain, the operation would take O(1)+O'(n) where O'(n) is the time to traverse the link list to find the element.

Figure 2A:
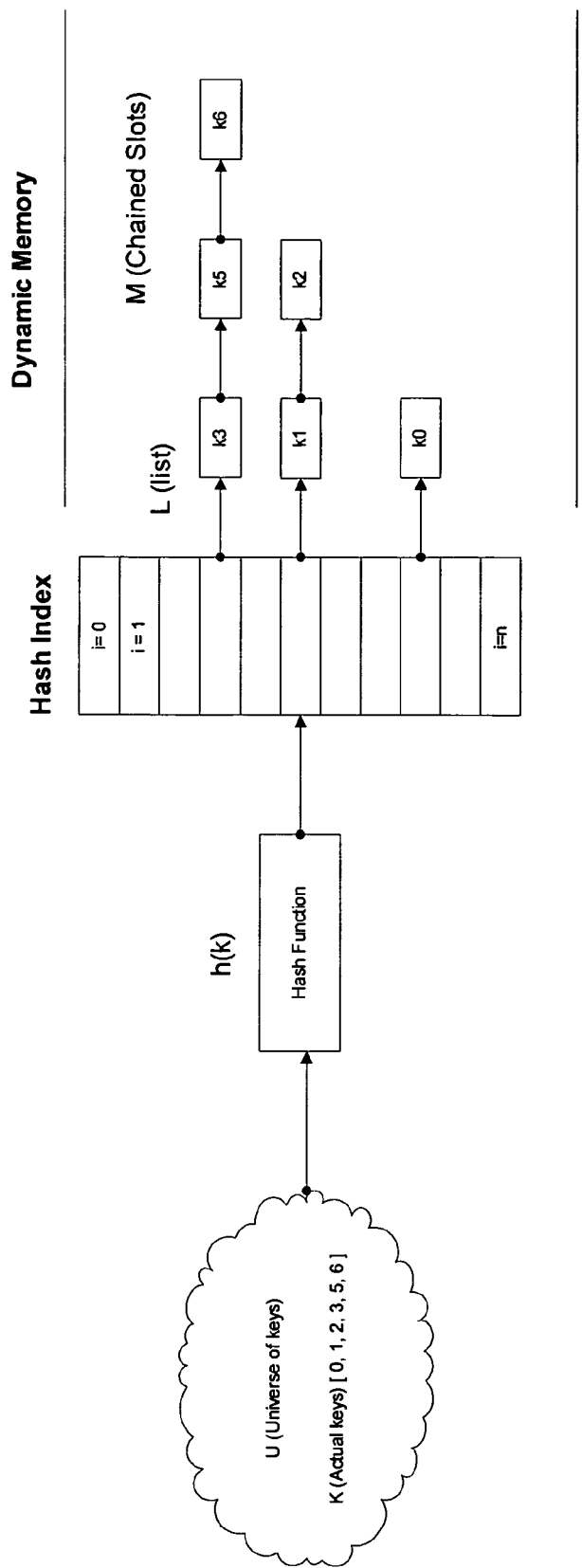

FIG. 2A shows an example of a Hash Table. From a set of U (the universe of keys), the set k of keys is used. The value of k is used, by the hash function h, to compute the hash index i. The range of the hash index i is bound by the hash function from i=0 to i=n. A hash function is used to map the key h(k) into a hash index i which points to List L that may contain M slots.

The hash function computes each index i to be equally likely to point to unique list L where i(n) approximately equals to L(n). However, depending on the hash function, a particular key k may hash to the same index i—resulting in what is known as a "collision." Chaining the data blocks pointed to by the index i helps eliminates the problem due to collisions. Thus when the hash function generates the same index i, from a given two different k, their data slots M will be on a linked list L pointed by index i. Any subsequent entry that hash to the same hash index will be just added to the list that is pointed by hash index i.

In some implementations of the IMP system, the chained hashing will be done using shared memory as opposed to the conventional dynamic memory allocation, as illustrated in FIG. 2B. At program startup, the server should allocate the Hash Index, Shared Memory Area (Hash Table), and the Free Slot Index. The Hash Index is range of possible index that the hash function can generate. It also contains a column that maps to the hash table index.

The hash table is implemented using shared memory. This area contains the index, the data block and the link columns. The index is the static index for that particular shared memory block. The link entry is used to chain the memory blocks. Chaining of memory blocks starts with the memory block index or free slot index. The Free Slot Index maintains the next available memory slots in the Shared Memory Area (Hash Table).

Figure 3:
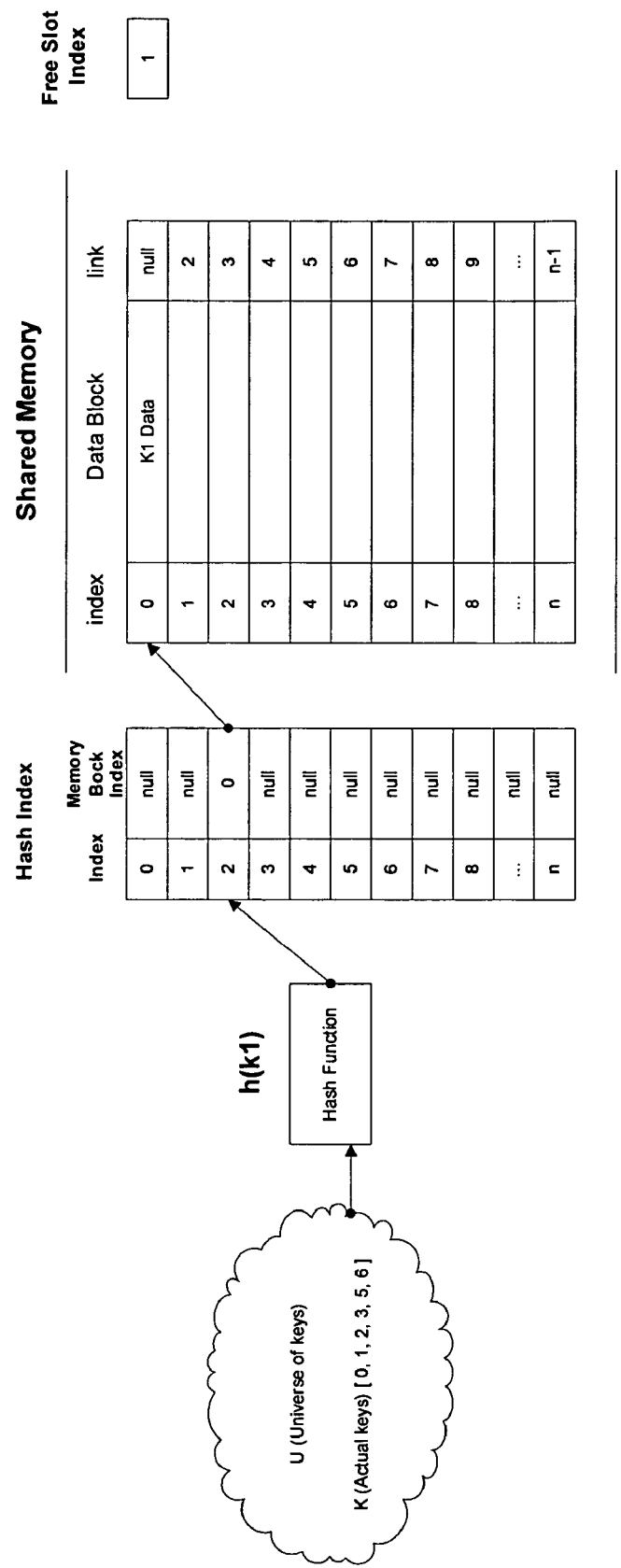
FIGS. 3 through 18 illustrate various stages and operations of the chained hash code implementation.

FIG. 3 illustrates an example Initial Insert operation. On initial insert into the hash table, the following sequence of steps occurs: 1) The hash function h(k1) generates an index. This index in the example happens to be 2. 2) The generated index is mapped against the Hash Index. 3) The NEXT available memory slot is obtained from the Free Slot Index—0. 4) The k1 data is inserted/copied into the memory slot index 0. Since this is NOT a collision (indicated by a null value in Memory Bock Index), the free slot index is updated to the value of link index which is 1. Since this is the first non collision-entry, the shared memory link index is set to null. Lastly, the memory block index is updated to 0.

Figure 4:
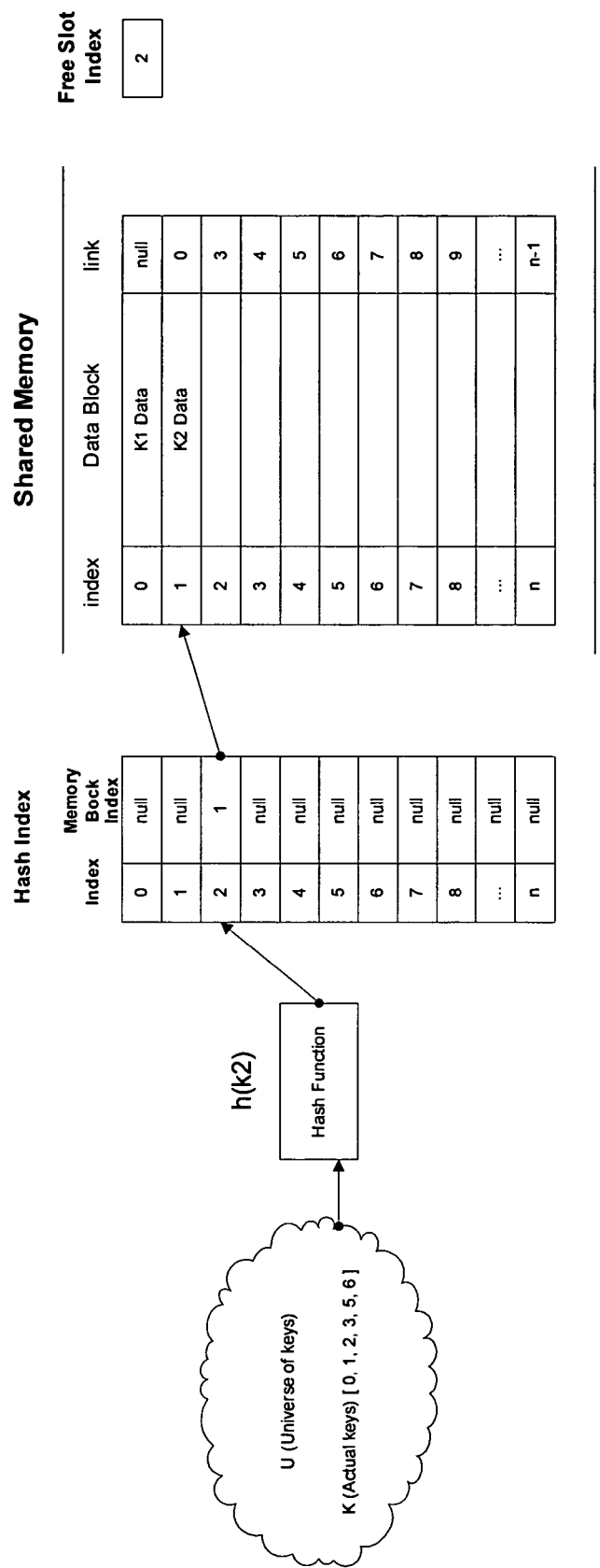

FIG. 4 illustrates a Collision Insert process. On an event when the hash function generates the same key as the previous entry that was inserted, the following steps occur: 1) The hash function h(k2) generates an index. This index happens to be 2 again—a collision. 2) The generated index is mapped against the Hash Index. 3) The NEXT available memory slot is obtained from the Free Slot Index—1. 4) The k2 data is inserted/copied into the memory slot index 1. Since this is a collision event (indicated by a non-null value in Memory Block Index), the free slot index is updated to the value of link index which is 2. Since chaining will occur, the memory link index is updated to point to previous slot which is 0. Lastly, the memory block index is updated to 1.

Figure 5:
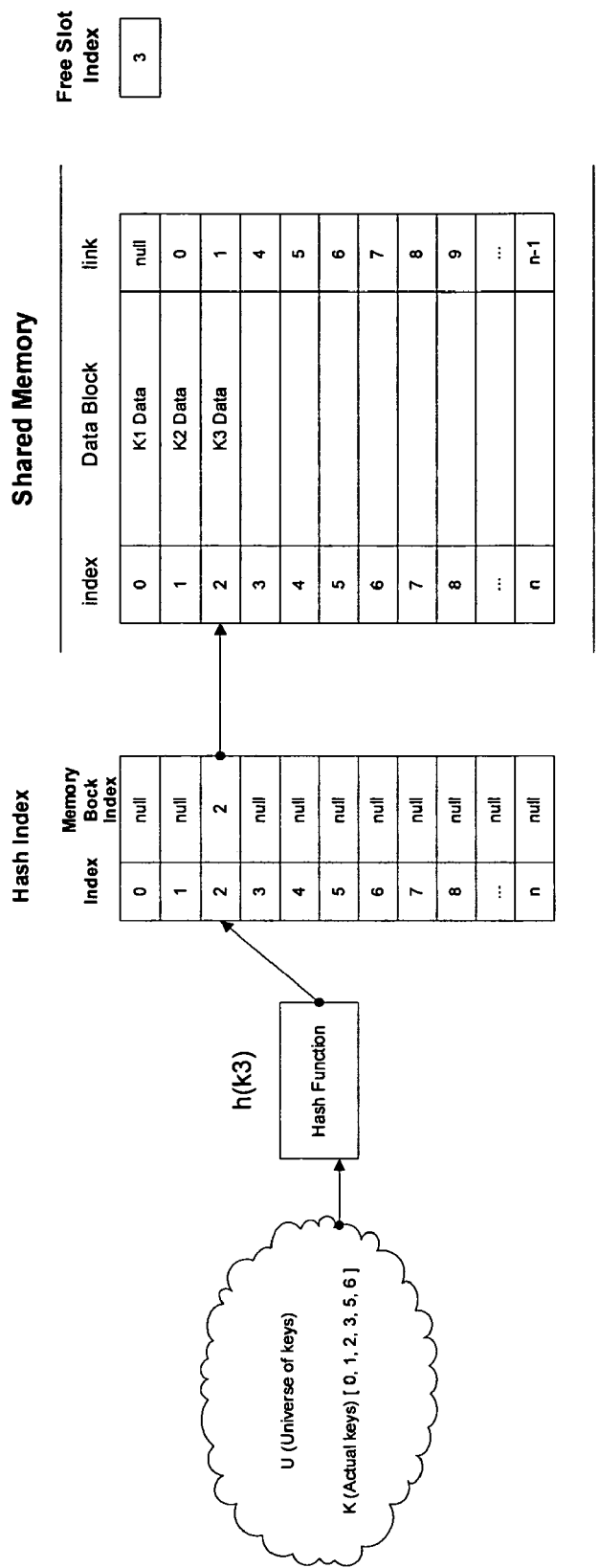

FIG. 5 illustrates another Collision Insert process. The steps are similar to those shown in FIG. 4. 1) The hash function h(k3) generates an index. This index in the example is again 2—a collision. 2) The generated index is mapped against the Hash Index. 3) The NEXT available memory slot is obtained from the Free Slot Index—2. 4) The data is inserted/copied into the memory slot index 2. Since this is a collision event (indicated by a non-null value in Memory Block Index), the free slot index is updated to value of link index which is 3. Since chaining will occur, the memory link index is updated to point to the previous slot, which is 1. Then, 5) Update memory block index t0 2.

Figure 6:
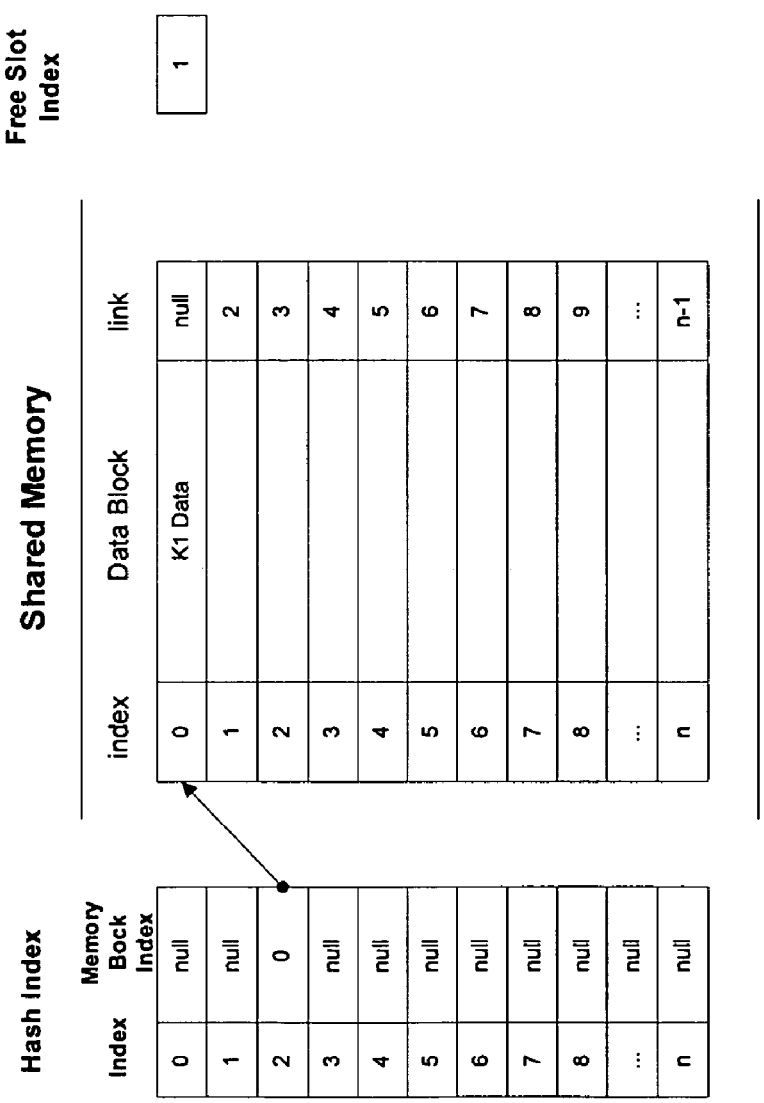
Figure 7:
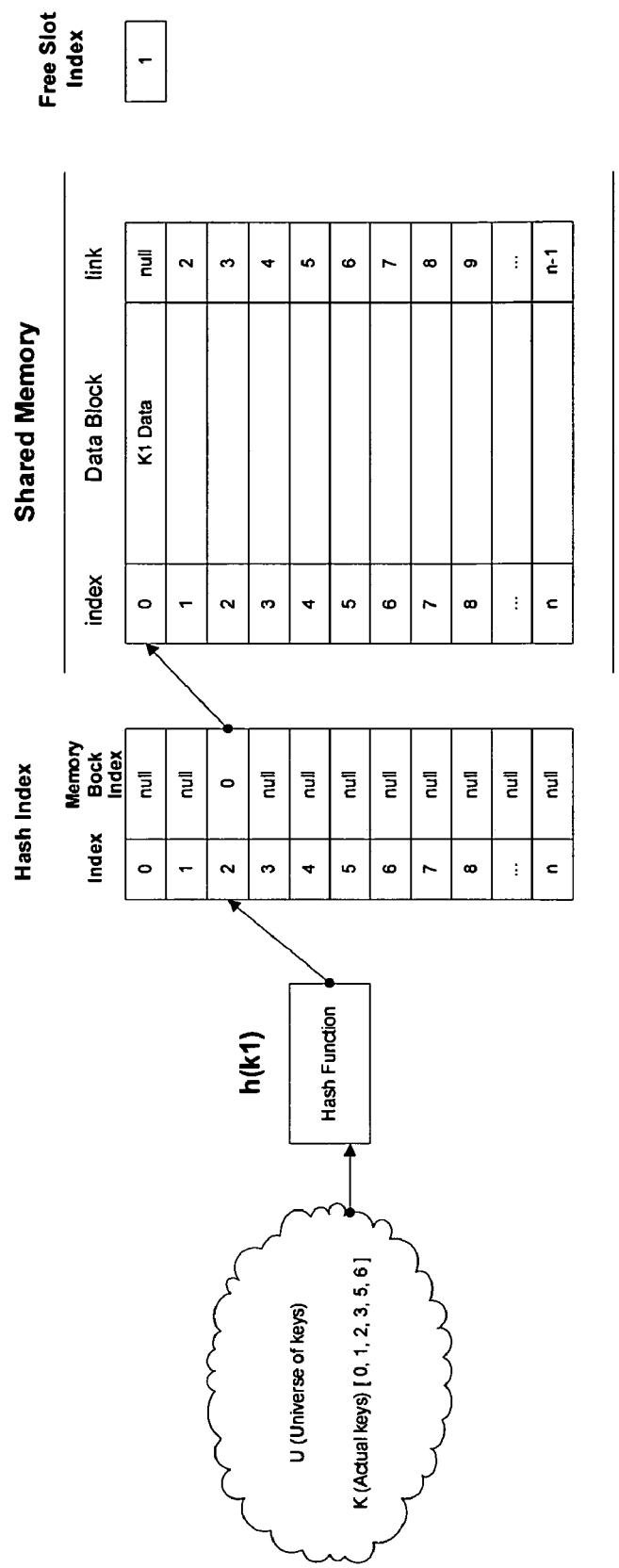

The deletion of an element in the hash table will now be described. The element being deleted in here is the only element in the chain. FIG. 6 shows the state of the hash table before the delete takes place. FIG. 7 shows a process to search a Non Collision Key. The steps in searching the record to be deleted include 1) Hash function h(k1) generates an index for the key k1. 2) The generated index is mapped against the Hash Index. 3) The Hash Index points to memory slot 0. Since this is NOT a collision event (Indicated by the null value in the link column), Compare k1 to the K1 data in memory slot 0. If K1 !=K1 data, then record not found. (No further steps needed since record not found). If K1=K1 data, then record found.

Figure 8:
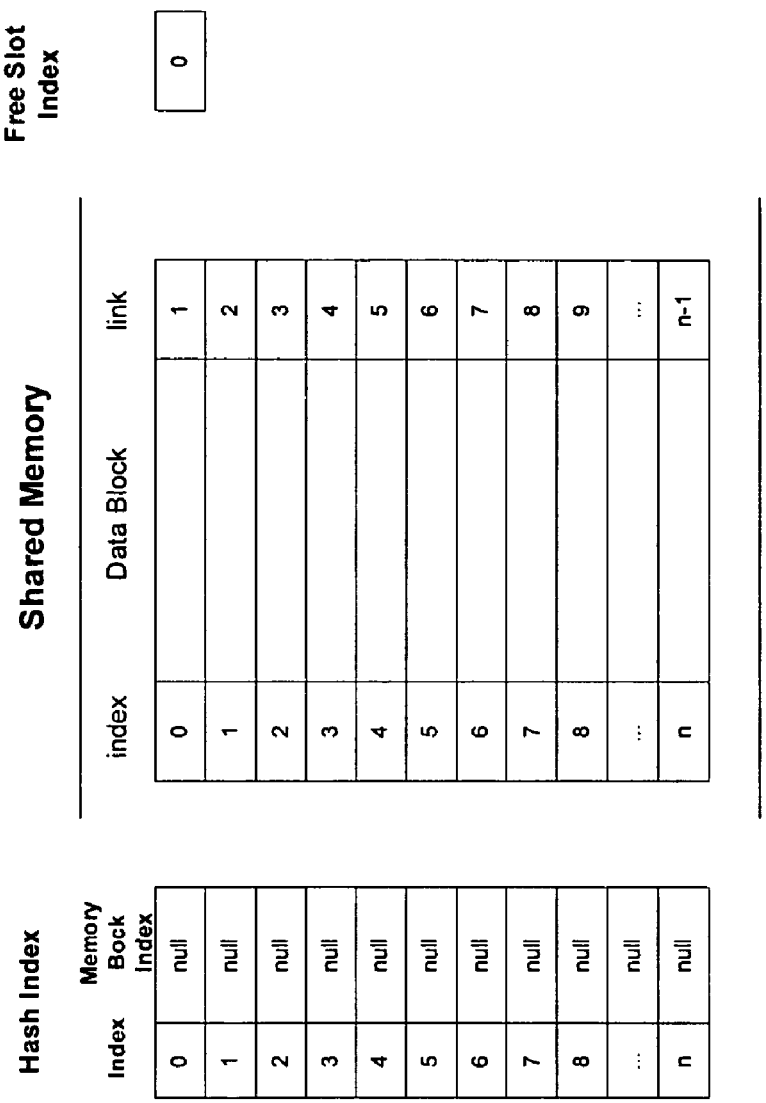

FIG. 8 illustrates a process to delete a Non Collision Key. After finding the record, the steps in performing the delete operation include: 1) Delete record in memory slot 0. 2) Update link index to value of free slot index which is 1. 3) Update Free Slot index to 0. 4) Update Memory Block Index to null.

Figure 9:
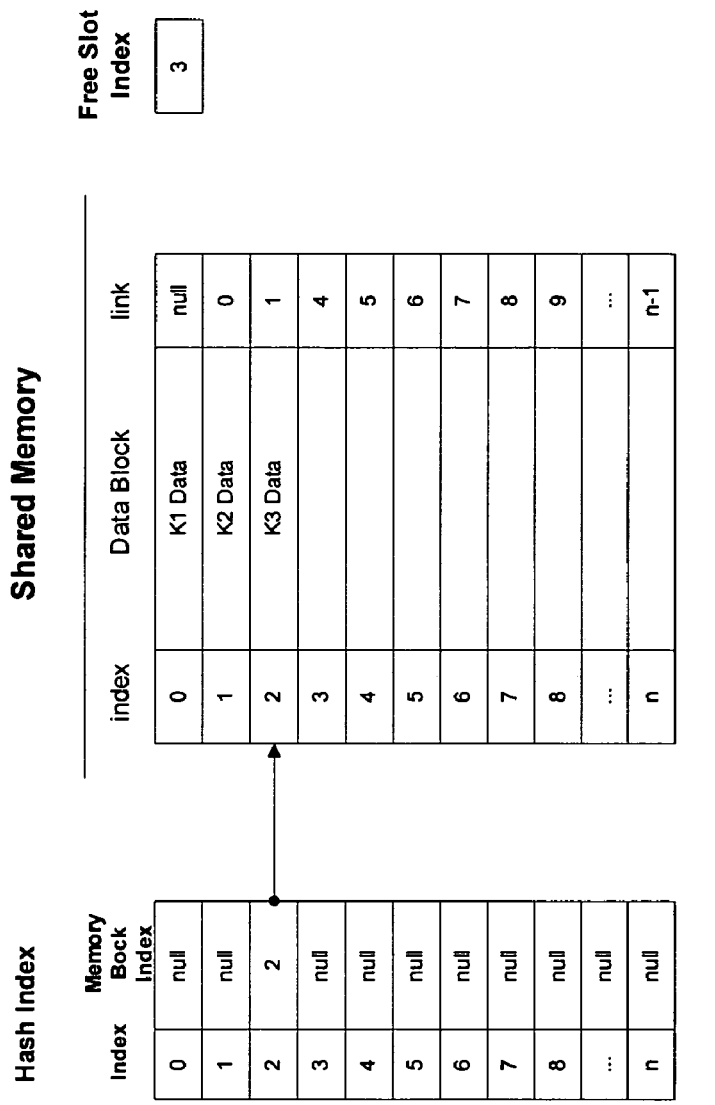

The deletion of an element in the hash table will now be described. The element being deleted is chained. Thus there is a need to traverse the list that is pointed by the memory block index. FIG. 9 shows the state of the hash table before the delete takes place.

Figure 10:
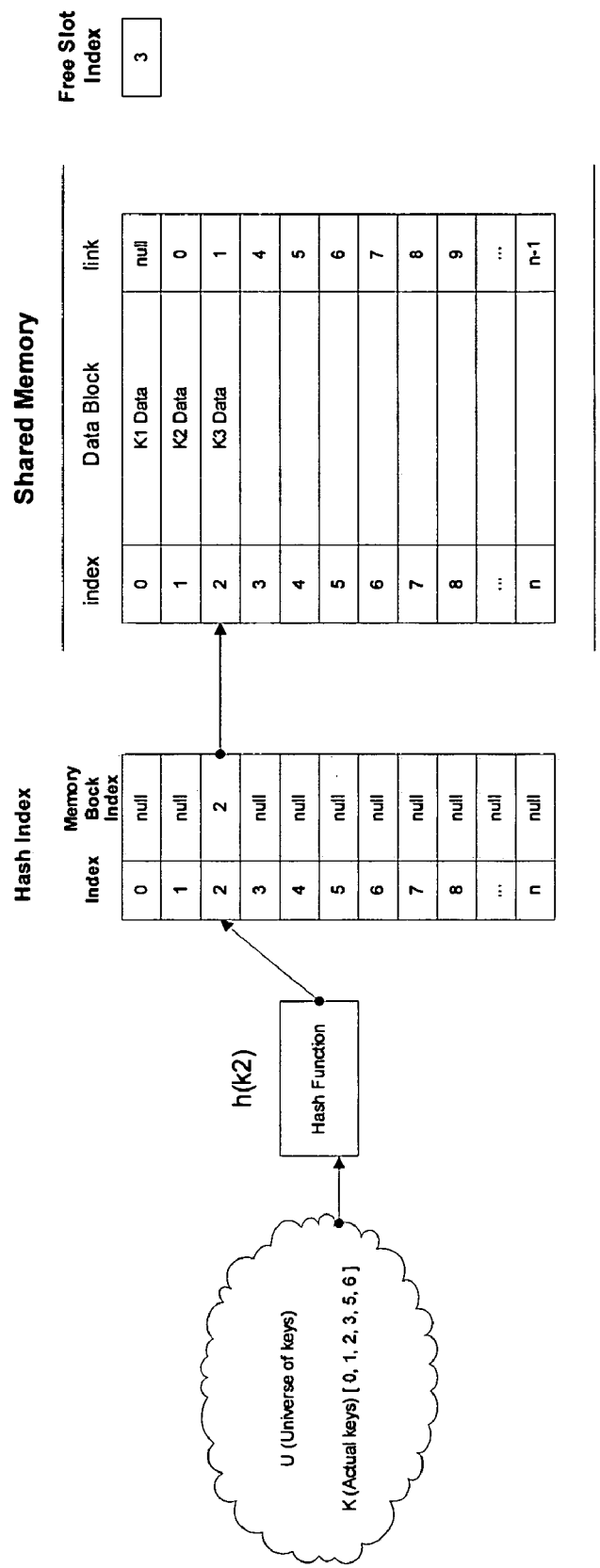

FIG. 10 illustrates a process to search a Collision Key. The steps in searching the record to be deleted include: 1) Hash function h(k2) generates an index for the key k2. 2) The generated index is mapped against the Hash Index. 3) The Hash Index points to memory slot 2. Since this is a collision key (Indicated by the a valid value in the link column & the non null link value of slot 2), search the list for the record by using the link column to find the next record. If K2 !=K2 data, then the record not found and no further steps are needed. If K2==K2 data, then the record found.

Figure 11:
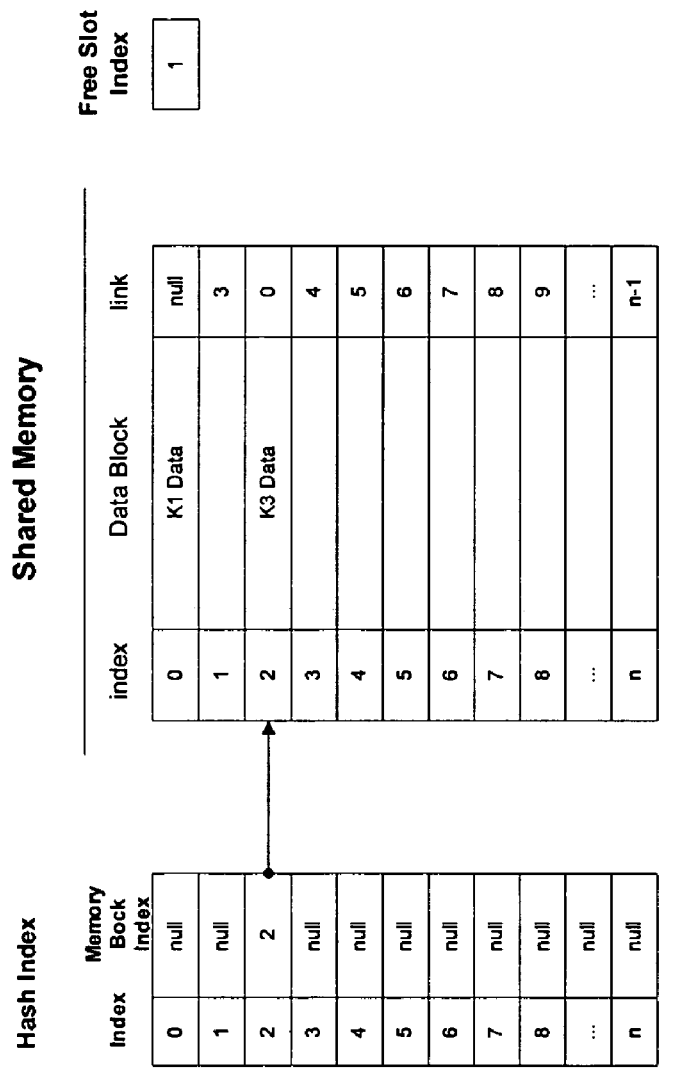

After finding the record, here is the step in performing the non collision key delete operation is as follows, as illustrated in FIG. 11: 1) Delete the record in memory index 1. 2) Update link column of previous record, which is in memory index 2, to have value of link column of memory index 1 which is 0. 3) Update link column of memory slot 1 to value of Free Slot Index which is 3. 4) Update Free Slot index by to value of 1.

When all the shared memory nodes are exhausted, the IMP system recycles already used nodes to provide new spaces for new data. This calls for deleting the oldest updated/created nodes in the system thus freeing those node and making them available for the new data to use.

Figure 12:
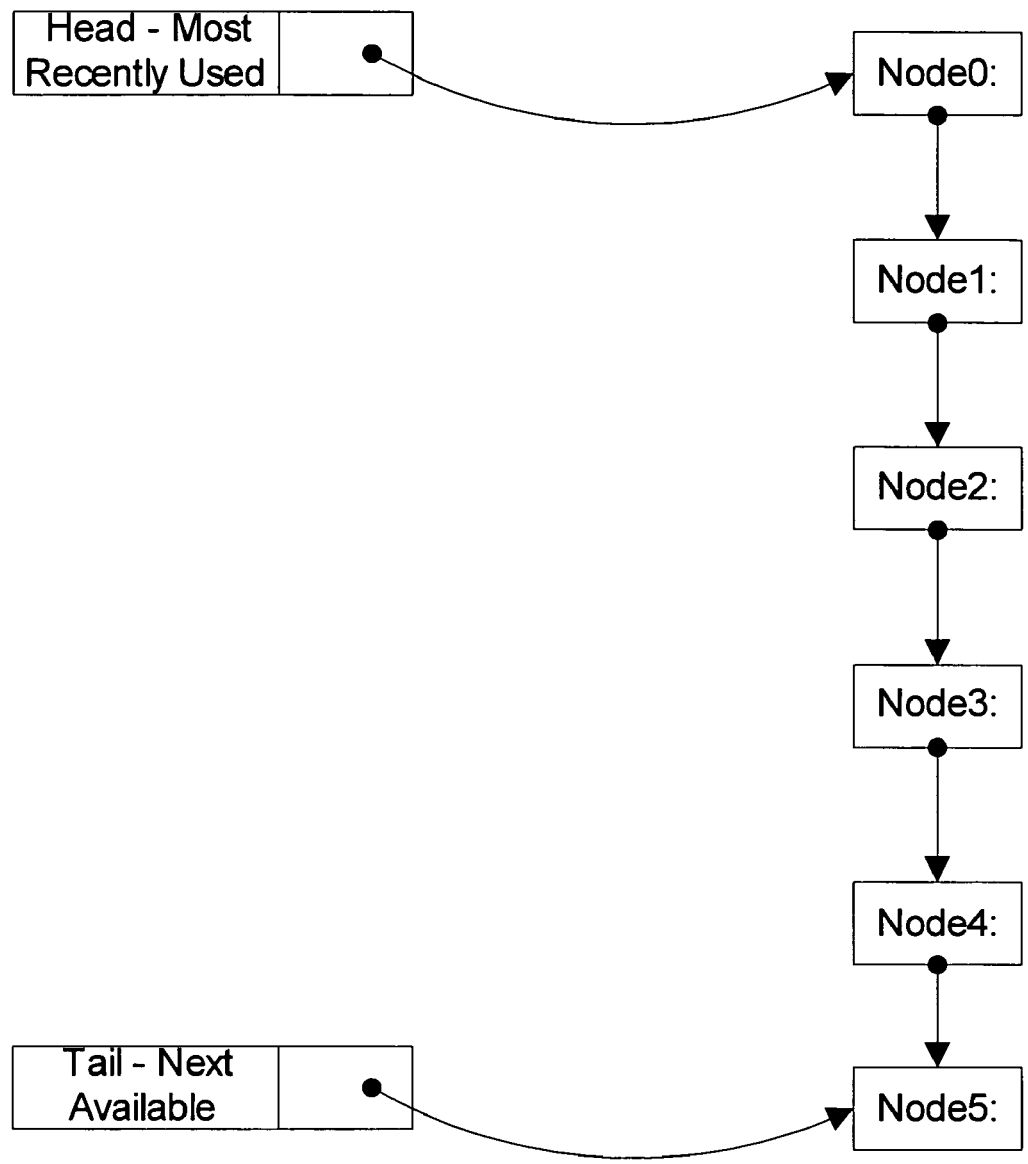

The priority for recycling used nodes is to recycle the oldest created/updated node in the system. In this approach a single lists is used to keep track of the available shared memory nodes, as well as the, aged nodes (Most Recently Used). The head pointer, Most Recently Used, keeps track of the nodes to aged. The tail pointer, Next Available, keeps track of the next available node. FIG. 12 illustrates the initial state of the list.

Figure 13:
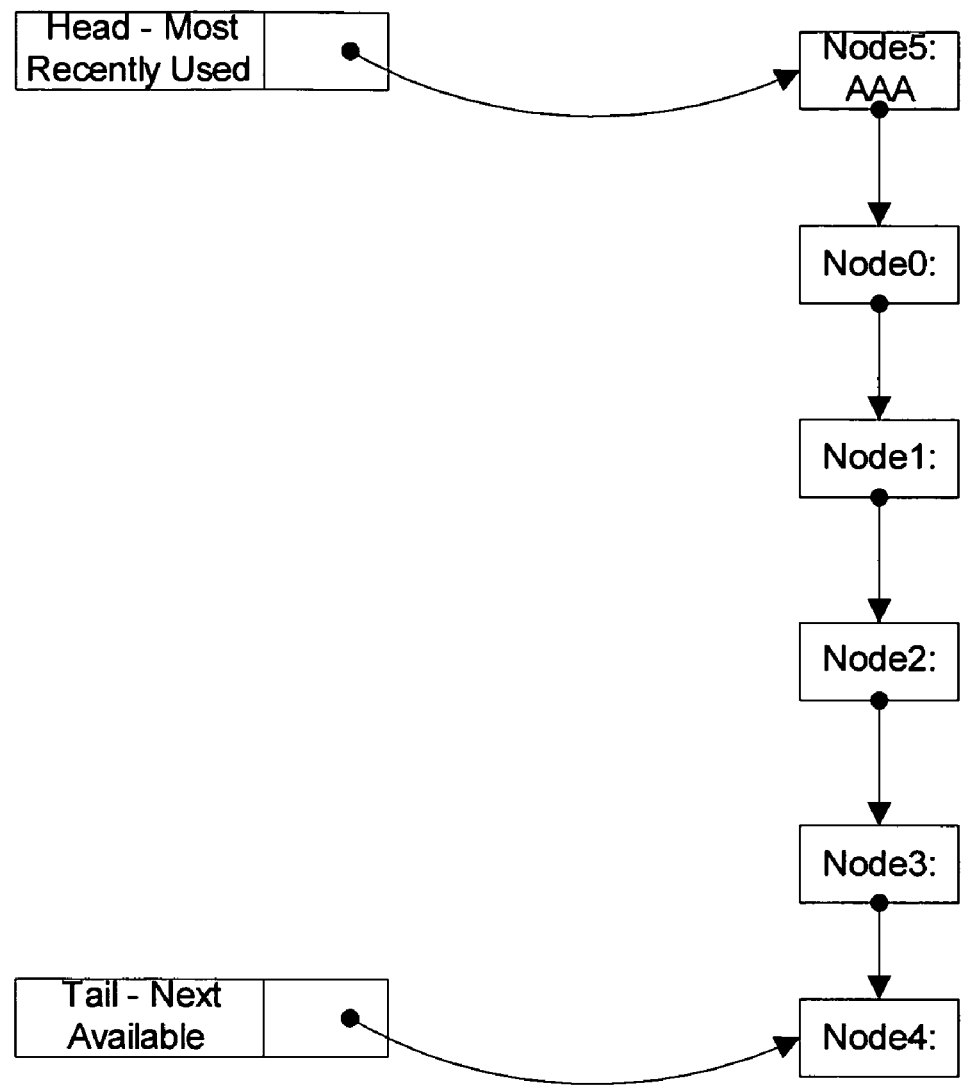

For an insert, a node is taken from the bottom (node5) of the list and place to top. This node contains the new data (AAA). The head pointer points to this node. The tail pointer now points to the previous node (node4). FIG. 13 shows the list after operation takes place. When new nodes are inserted, they are added to the end of the head list. The beginning of the head list is the most recently used nodes, while the nodes towards the end of the head list are the least used and are a candidates for aging (i.e. these nodes can be deleted).

Figure 14:
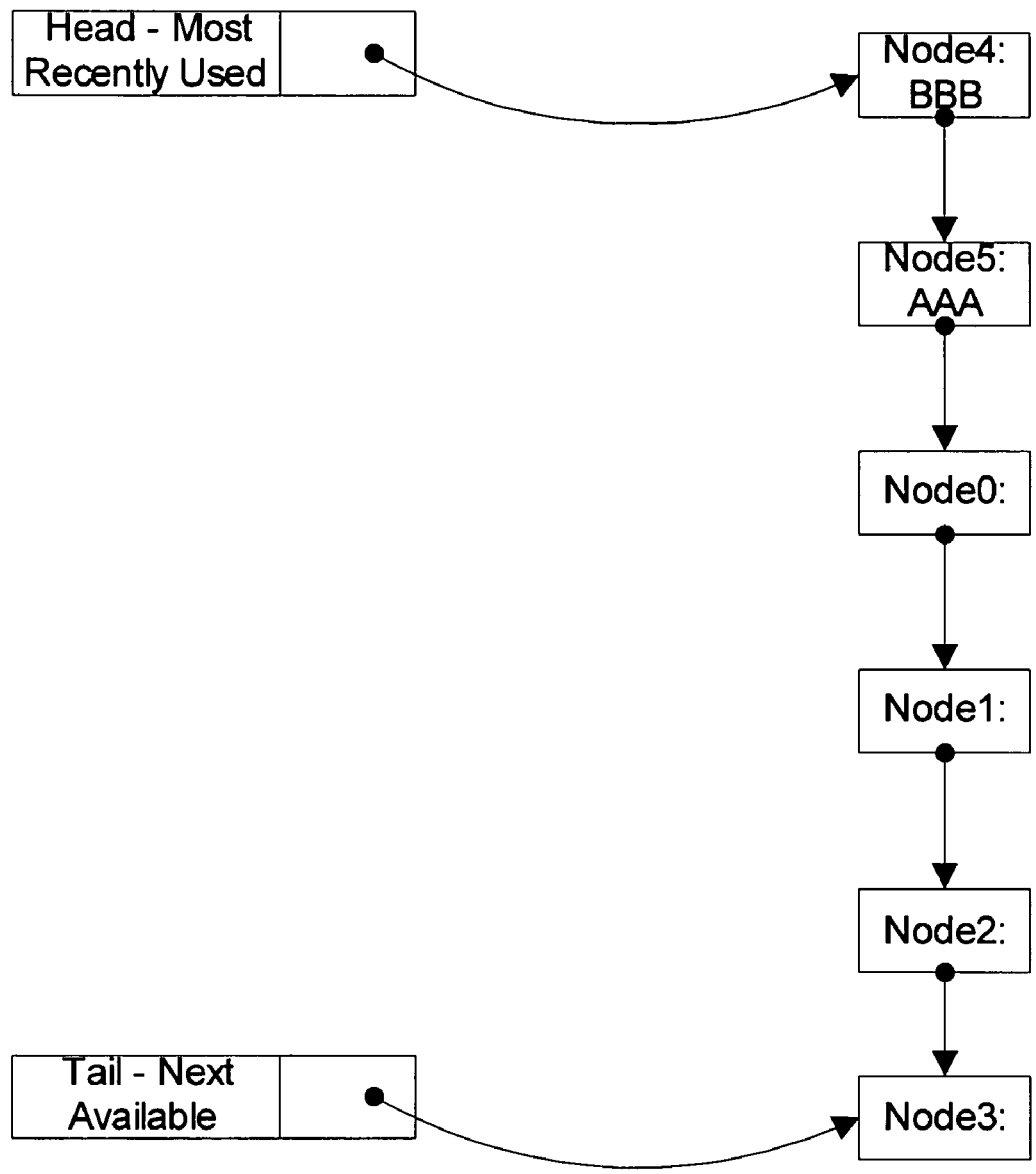

FIG. 14 shows another insert and the list after the operation takes place. Again a node is taken from the bottom (node4) of the list. This node is added to the recently used list. This node contains the new data (BBB). The tail pointer now points to the previous node (node3).

Figure 15:
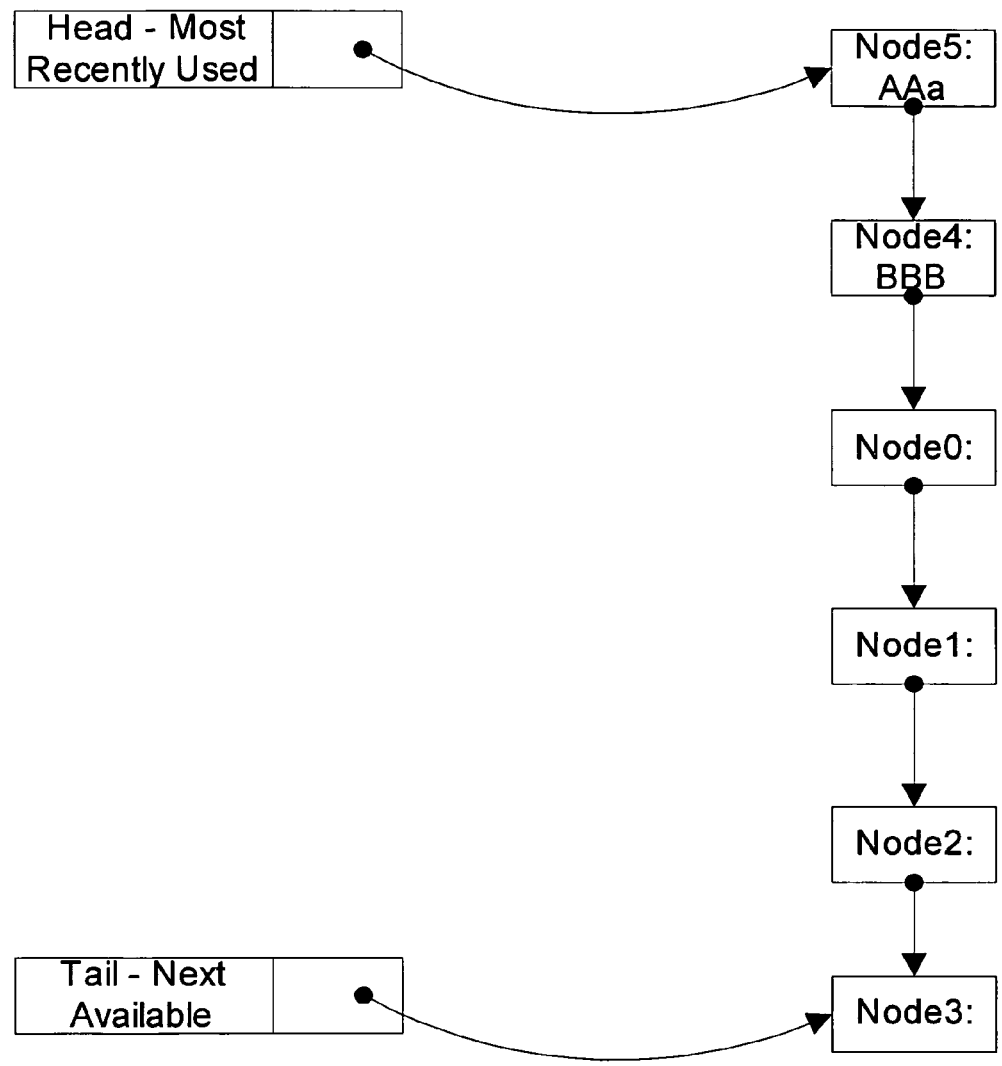

For update transactions, the node that is being updated is placed on top of the list and becomes pointed to by the head. FIG. 15 shows the state of the list after an update occurs on node5 which contains AAA. Node5 contents are updated to AAA. Node4 is place on top of the list and now is being pointed the head. No changes are made on the tail pointer.

Figure 16:
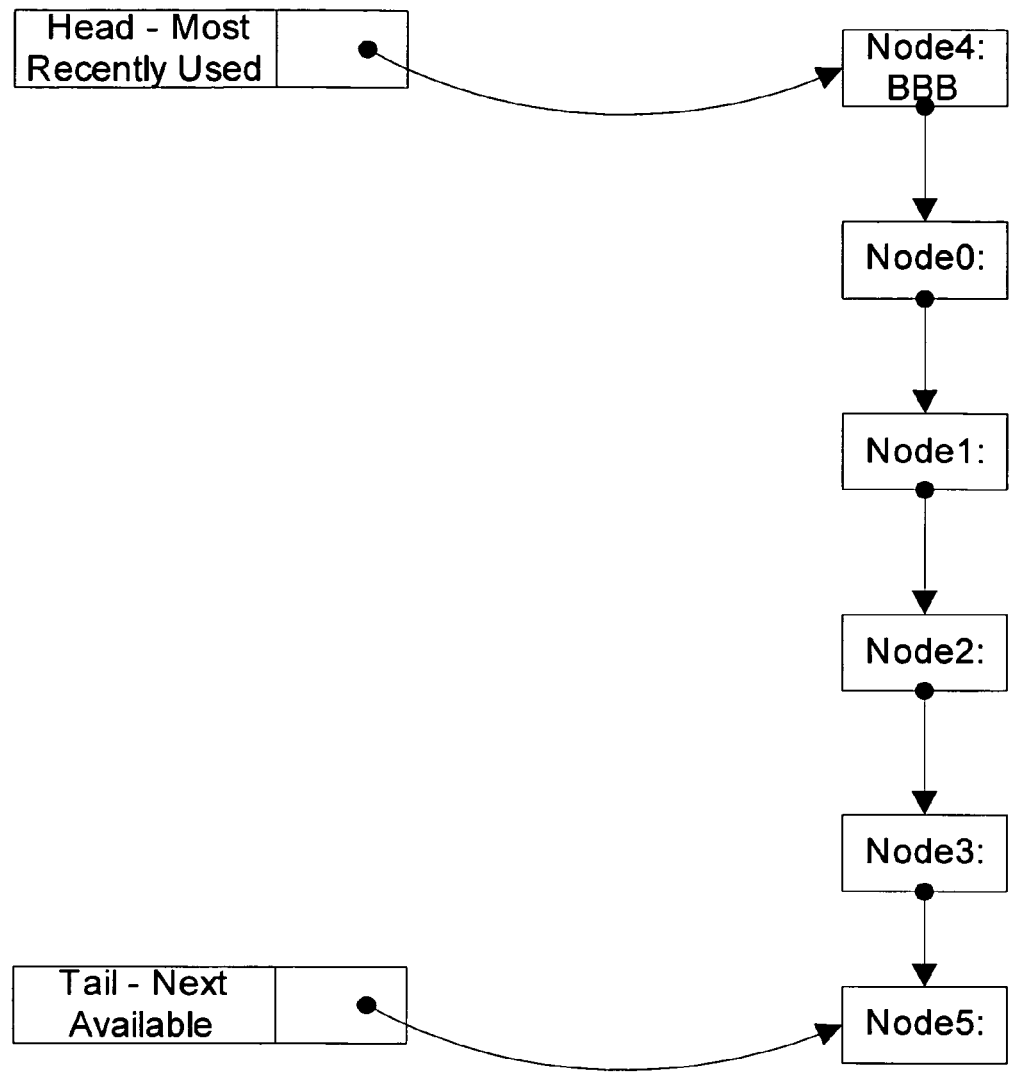
Figure 17:
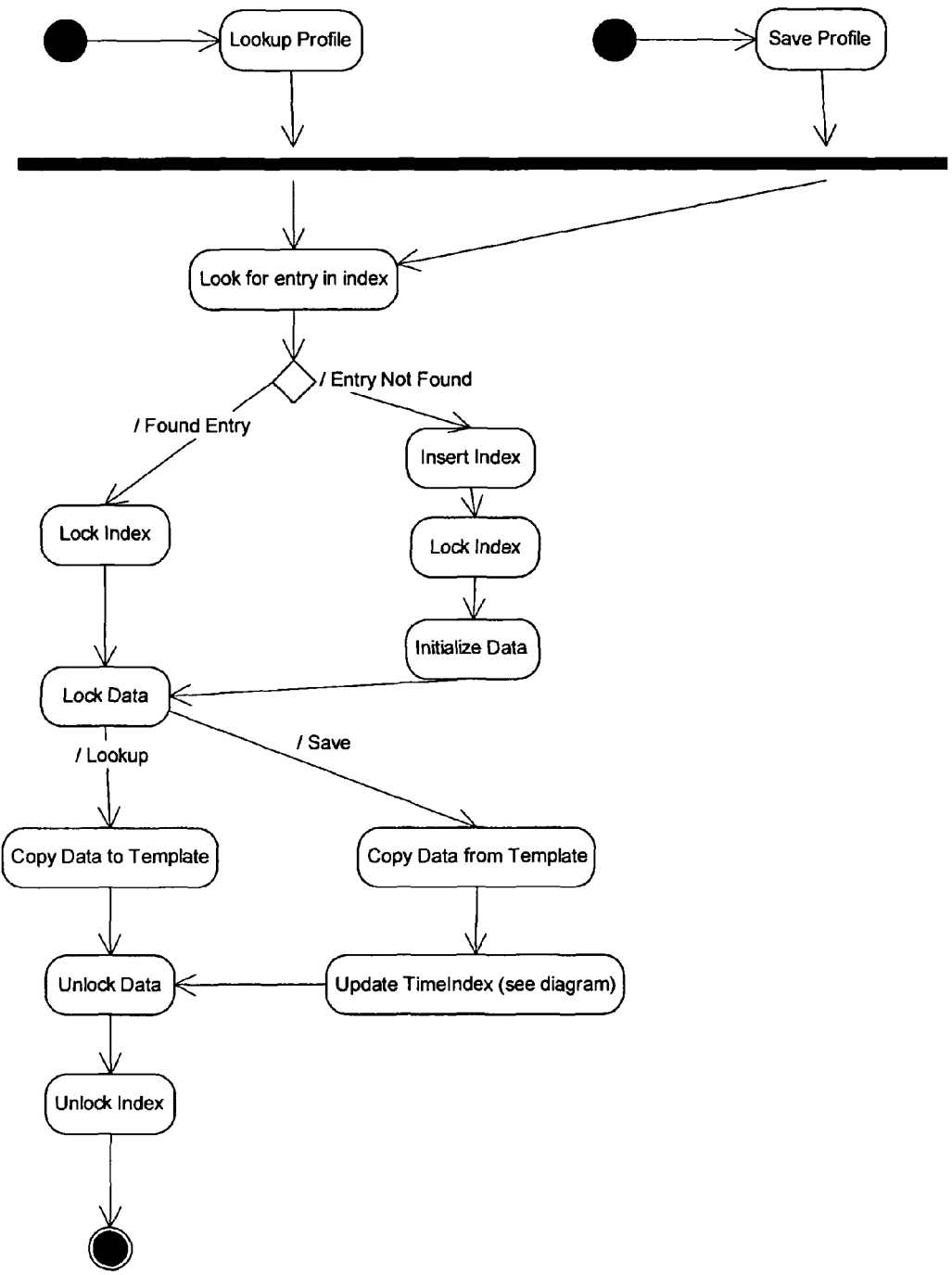
Figure 18:
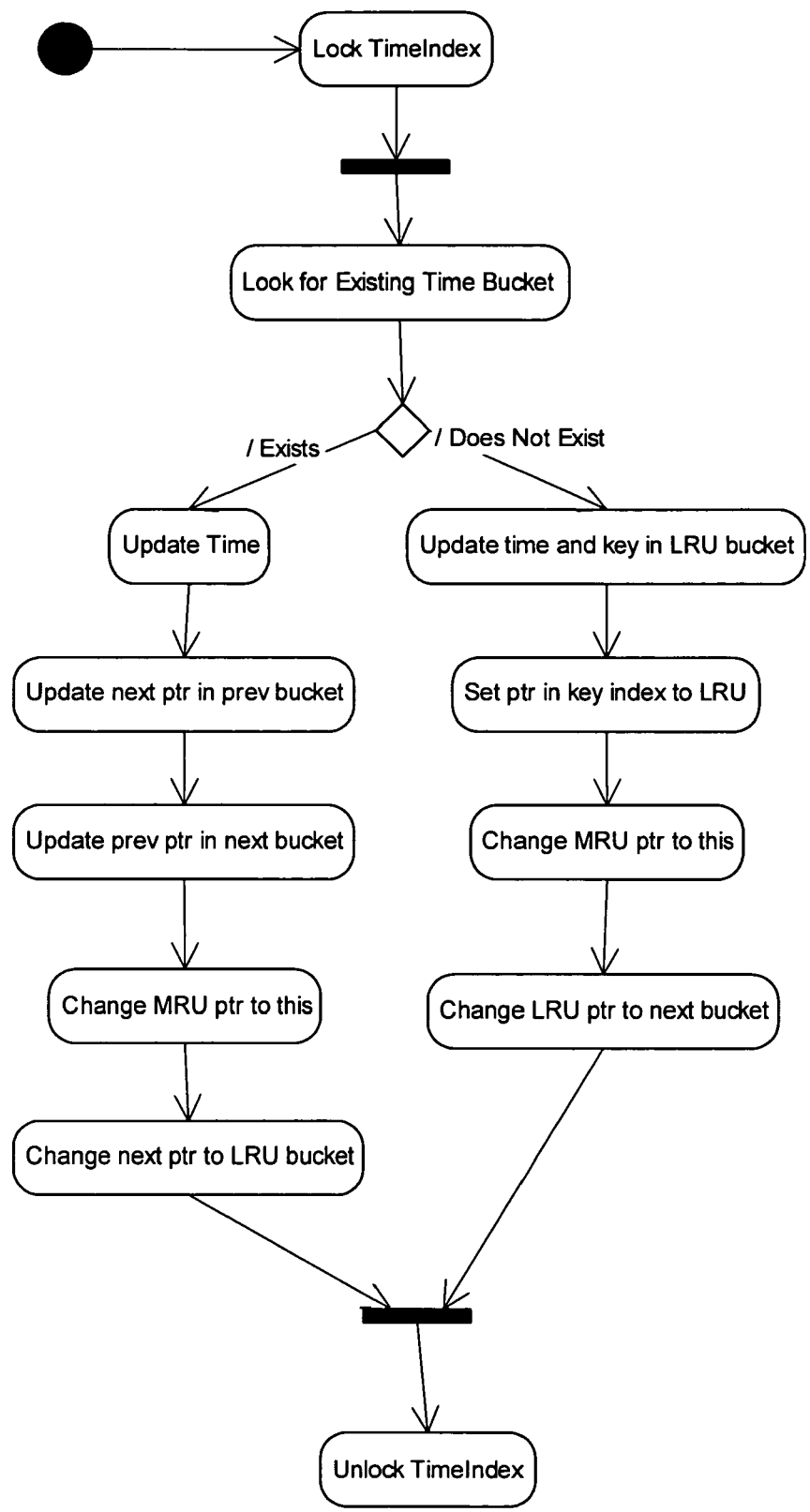

For delete transactions, the node that is being deleted is place to the bottom of the list and becomes pointed to by tail. FIG. 16 shows the state of the list after deleting node5 which contains AAA. Node5 is moved and placed at the bottom of the list. The tail pointer is updated to point to node5, and the head pointer is updated.

On demand aging takes place when the system runs out of shared memory node to use. Thus the system must age candidate nodes to make the nodes available. One method includes using a time stamp on the nodes. The shared memory segment containing the nodes can be traversed, either on-demand or by another process (such as cron job). During the node traversal, the time stamp is compared against a pre-defined time criteria. Any node that falls within the defined criteria is deleted from the shared memory segment and thus gets recycled into the system. Implementation of the brute force deletion can be configurable to delete only some number of nodes with time out in between deletion to minimize system performance degradation during the aging operation.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A method of detecting revenue leakage in a telecommunications system, the method comprising:
    detecting characteristics of non-reconciled SS7/C7 service detail records for calling line identities across point codes and routes of the telecommunications system
    generating an absolute value, frequency and proportion for at least one of the detected characteristics; and
    reporting the detected characteristics in a hierarchal summarization according to the absolute value, frequency and proportion.

2. A method in accordance with claim 1, wherein the characteristics include a route identifier of the telecommunications system.

3. A method in accordance with claim 1, wherein the characteristics include at least one serving/destination point code of the telecommunications system.

4. A method in accordance with claim 1, wherein the characteristics include an international/domestic designator.

5. A method in accordance with claim 1, wherein the characteristics include a destination country.

6. A method in accordance with claim 1, wherein the characteristics include a premium rate designator.

7. A method in accordance with claim 1, wherein the characteristics include a mobile number.

8. A method in accordance with claim 1, wherein the characteristics include a dial around access code.

9. A method in accordance with claim 1, wherein the hierarchal summarization includes absolute values, frequency and proportion of the detected characteristics.

10. A method in accordance with claim 1, further comprising displaying the hierarchical summarization in a computer display.

* * * * *

UNITED STATES PATENT AND TRADEMARK OFFICE
CERTIFICATE OF CORRECTION

PATENT NO. : 7,961,857 B2
APPLICATION NO. : 11/446453
DATED : June 14, 2011
INVENTOR(S) : Scott M. Zoldi It is certified that error appears in the above-identified patent and that said Letters Patent is hereby corrected as shown below:

At column 12, line number 11, claim 1 should read --codes and routes of the telecommunications system;--

Signed and Sealed this
Tenth Day of April, 2012

David J. Kappos
*Director of the United States Patent and Trademark Office*